United States Patent [19]

Toomarian et al.

[11] Patent Number: 5,428,710
[45] Date of Patent: Jun. 27, 1995

[54] FAST TEMPORAL NEURAL LEARNING USING TEACHER FORCING

[75] Inventors: Nikzad Toomarian, Encino; Jacob Barhen, La Crescenta, both of Calif.

[73] Assignee: The United States of America as represented by the Administrator of the National Aeronautics and Space Administration, Washington, D.C.

[21] Appl. No.: 908,677

[22] Filed: Jun. 29, 1992

[51] Int. Cl.$^6$ ............................................. G06F 15/18
[52] U.S. Cl. ...................................... 395/23; 395/20; 395/21
[58] Field of Search ................ 395/21, 22, 23, 11, 395/27; 382/15

[56] References Cited

U.S. PATENT DOCUMENTS

| | | | |
|---|---|---|---|
| 4,804,250 | 2/1989 | Johnson | 330/162.12 |
| 4,912,652 | 3/1990 | Wood | 364/513 |
| 4,918,618 | 4/1990 | Tomlinson, Jr. | 364/513 |
| 4,926,064 | 5/1990 | Tapang | 307/201 |
| 4,951,239 | 8/1990 | Andes et al. | 364/807 |
| 4,953,099 | 8/1990 | Jourjine | 364/513 |
| 4,967,369 | 10/1990 | Jourjine | 364/513 |
| 4,990,838 | 2/1991 | Kawato et al. | 318/568.10 |
| 5,014,219 | 5/1991 | White | 395/23 |
| 5,046,019 | 9/1991 | Basehore | 364/513 |
| 5,046,020 | 9/1991 | Filkin | 364/513 |
| 5,050,095 | 9/1991 | Samad | 364/513 |
| 5,052,043 | 9/1991 | Gaborski | 382/14 |
| 5,056,037 | 10/1991 | Eberhardt | 395/23 |
| 5,058,034 | 10/1991 | Murphy et al. | 395/23 |
| 5,075,868 | 12/1991 | Andes et al. | 395/23 |
| 5,086,479 | 2/1992 | Takenaga et al. | 382/14 |
| 5,093,899 | 3/1992 | Hiraiwa | 395/23 |
| 5,146,602 | 9/1992 | Holler et al. | 395/23 |
| 5,253,329 | 10/1993 | Villarreal et al. | 395/23 |
| 5,313,558 | 5/1994 | Adams | 395/22 |

OTHER PUBLICATIONS

Michail Zak, "Terminal Attractors in Neural Networks," Neural Networks, vol. 2, pp. 259–274, 1989.
J. Barhen, et al., "Application of Adjoint Operators to Neural Learning", Aool. Math. Lett., vol. 3 No. 3, pp. 13–18, 1990 Printed in Great Britain.
J. Barhen, et al., "Adjoint Operator Algorithms for Faster Learning Dynamical Neural Networks", Center for Space Micro-electronics Technology, Jet Propulsion Laboratory, California Institute of Technology, pp. 498–508.
R. J. Williams et al., "A Learning Algorithm for continually running fully recurrent neural networks," Neural Computation, vol. 1, No. 2 pp. 270–280.

(List continued on next page.)

*Primary Examiner*—Robert W. Downs
*Assistant Examiner*—Tariq R. Hafiz
*Attorney, Agent, or Firm*—John H. Kusmiss; Thomas H. Jones; Guy M. Miller

[57] ABSTRACT

A neural network is trained to output a time dependent target vector defined over a predetermined time interval in response to a time dependent input vector defined over the same time interval by applying corresponding elements of the error vector, or difference between the target vector and the actual neuron output vector, to the inputs of corresponding output neurons of the network corrective feedback. This feedback decreases the error and quickens the learning process, so that a much smaller number of training cycles are required to complete the learning process. A conventional gradient descent algorithm is employed to update the neural network parameters at the end of the predetermined time interval. The foregoing process is repeated in repetitive cycles until the actual output vector corresponds to the target vector. In the preferred embodiment, as the overall error of the neutral network output decreases during successive training cycles, the portion of the error fed back to the output neurons is decreased accordingly, allowing the network to learn with greater freedom from teacher forcing as the network parameters converge to their optimum values. The invention may also be used to train a neural network with stationary training and target vectors.

39 Claims, 10 Drawing Sheets

OTHER PUBLICATIONS

R. J. Williams et al., "A Learning Algorithm for continually running fully recurrent neural networks," Technical Report ICS Report 8805, UCSD, La Jolla, California 92093.

Kumpati S. Narendra fellow, IEE and Kannan Parthasarathy, "Identification and Control of Dynamical Systems Using Neural Networks", vol. 1 No. 1, Mar. 1990.

Masa-aki Sato, "A Learning Algorithm to Teach Spatiotemporal Patterns to Recurrent Neural Networks", Biological Cybernetics, (1990) pp. 259-263.

Masa-aki Sato, "A Real Time Learning Algorithm for Recurrent Analog Neural Networks", Biological Cybernetics, (1990) pp. 237-241.

Fernando J. Pineda, "Time Dependent Adaptive Neural Networks", Center for Microelectronics Technology, Jet Propulsion Laboratory, California Institute of Technology, pp. 710-718.

N. Toomarian and J. Barhen, "Adjoint-Operators and Non-Adiabatic Learning Algorithms in Neural Networks", Appl. Math. Lett., vol. 4 No. 2, pp. 69-73, 1991, printed in Great Britain.

Barak A. Pearlmutter, "Dynamic Recurrent Neural Networks", School of Computer Science, Carnegie Mellon University, Pittsburgh, Pa. 15213. This research was sponsored in part by The Defense Advanced Research Projects Agency, Information Science and Technology Office, under the title Research on Parrallel Computing, ARPA Order No. 7330 issued by DARPA/CMO.

Barak A. Pearlmutter, "Learning State Space Trajectories in Recurrent Neural Networks", Neural Computation 1, pp. 263-269 (1989) Massachusetts Institute of Technology.

FAST TEMPORAL NEURAL LEARNING USING TEACHER FORCING

BACKGROUND OF THE INVENTION

Origin of the Invention

The invention described herein was made in the performance of work under a NASA contract, and is subject to the provisions of Public Law 96-517 (35 USC 202) in which the contractor has elected not to retain title.

Technical Field

The invention relates to training neural networks with time dependent phenomena and to the problems associated therewith, including reducing the number of computations required and increasing the quality or fidelity of the neural network output.

Background Art

Recently, there has been a tremendous interest in developing learning algorithms capable of modeling time-dependent phenomena. In particular, considerable attention has been devoted to capturing the dynamics embedded in observed temporal sequences.

In general, the neural architectures under consideration may be classified into two categories:
* Feedforward networks, in which back propagation through time can be implemented. This architecture has been extensively analyzed, and is widely used in simple applications due, in particular, to the straightforward nature of its formalism.
* Recurrent networks, also referred to as feedback or fully connected networks, which are currently receiving increased attention. A key advantage of recurrent networks lies in their ability to use information about past events for current computations. Thus, they can provide time-dependent outputs for both time-dependent as well as time-independent inputs.

One may argue that, for many real world applications, the feedforward networks suffice. Furthermore, a recurrent network can, in principle, be unfolded into a multilayer feedforward network. A detailed analysis of the merits and demerits of these two architectures is beyond the scope of this specification. Here, we will focus only on recurrent networks.

The problem of temporal learning can typically be formulated as a minimization, over an arbitrary but finite time interval, of an appropriate error functional. The gradients of the functional with respect to the various parameters of the neural architecture, e.g., synaptic weights, neural gains, etc. are essential elements of the minimization process and, in the past, major efforts have been devoted to the efficacy of their computation. Calculating the gradients of a system's output with respect to different parameters of the system is, in general, of relevance to several disciplines. Hence, a variety of methods have been proposed in the literature for computing such gradients. A recent survey of techniques which have been considered specifically for temporal learning can be found in Pearlmutter, B. A. (1990) "Dynamic recurrent neural networks," Technical Report CMU-CS-90-196, School of Computer Science, Carnegie Mellon University, Pittsburgh, Pa. We will briefly mention only those which are relevant to the present invention.

Sato proposed, at the conceptual level, an algorithm based upon Lagrange multipliers. However, his algorithm has not yet been validated by numerical simulations, nor has its computational complexity been analyzed. Williams and Zipset [Williams, R. J., and Zipser, D. (1989) "A learning algorithm for continually running fully recurrent neural networks", *Neural Computation*, Vol. 1, No. 2, pp. 270–280] presented a scheme in which the gradients of an error functional with respect to network parameters are calculated by direct differentiation of the neural activation dynamics. This approach is computationally very expensive and scales poorly to large systems. The inherent advantage of the scheme is the small storage capacity required, which scales as $O(N^3)$, where N denotes the size of the network.

Pearlmutter, on the other hand, described a variational method which yields a set of linear ordinary differential equations for backpropagating the error through the system. These equations, however, need to be solved backwards in time, and require temporal storage of variables from the network activation dynamics, thereby reducing the attractiveness of the algorithm. Recently, the inventors herein [Toomarian, N. and Barhen, J. (1991) "Adjoint operators and non-adiabatic algorithms in neural networks," Applied Mathematical Letters, Vol. 4, No. 2, pp. 69–73] suggested a framework formalism which enables the error propagation system of equations to be solved forward in time, concomitantly with the neural activation dynamics. A drawback of this novel approach came from the fact that their equations had to be analyzed in terms of distributions, which precluded straightforward numerical implementation. Finally, Pineda proposed combining the existence of disparate time scales with a heuristic gradient computation. The underlying adiabatic assumptions and highly approximate gradient evaluation technique, however, placed severe limits on the applicability of his method.

Analogy to real-life behavior motivates the learning paradigm of the present invention described below. Suppose that a parent wants to teach his child to ride a bicycle. Clearly, the parent will not stay home, let his child ride the bicycle and, from time to time, tell him how good or bad he is performing (just as it happens in classical supervised learning). The best way to train the child would be for the parent to accompany him during the riding sessions. This suggests that different dynamical systems should be considered for the two basic stages of learning and recall (or generalization). However, the functional form of the neural dynamics used during the learning stage should smoothly evolve toward the functional form of the neural dynamics to be used during recall, after training is completed. In this context, the network dynamics during the learning stage should include an instantaneous signal from the teacher on its performance. This necessitates a mechanism for incorporating information regarding the desired output directly into the activation dynamics. Such a mechanism has been referred to as teacher forcing. Williams and Zipset [Williams, R. J., and Zipset, D. (1988) "A learning algorithm for continually running fully recurrent neural networks," Technical Report ICS Report 8805, UCSD, La Jolla, Calif. 92093], to the best of our knowledge, have been the primary users of teacher forcing. They limited their algorithm to a discrete- time problem, replacing the output of the network with desired output values at each time step.

SUMMARY OF THE INVENTION

The present invention is a new continuous form of teacher forcing, and appropriately modifies the activation dynamics of a simple additive neural network during its learning stage. The temporal modulation of teacher forcing is analyzed as learning proceeds, so that the activation dynamics of the learning stage can actually be reduced to the activation dynamics of the recall stage.

In accordance with the invention, a neural network is trained to output a time dependent target vector defined over a predetermined time interval in response to a time dependent input vector defined over the same time interval by applying corresponding elements of the error vector, or difference between the target vector and the actual neuron output vector, to the inputs of corresponding output neurons of the network as corrective feedback. This feedback decreases the error and quickens the learning process, so that a much smaller number of training cycles are required to complete the learning process. The learning process employs a conventional gradient descent algorithm to update the neural network parameters (e.g., synapse weights and/or neuron gains) at the end of the time interval. The foregoing process is repeated in repetitive cycles until the actual output vector corresponds to the target vector. It has been found that not only is the number of required training cycles decreased but that the quality or fidelity of the neural network output is significantly increased by the invention. In the preferred embodiment, as the overall error of the neural network output decreases during successive training cycles, the portion of the error fed back to the output neurons is decreased accordingly, allowing the network to learn with greater freedom from teacher forcing as the network parameters converge to their optimum values.

DETAILED DESCRIPTION OF THE INVENTION

Figure 1A:
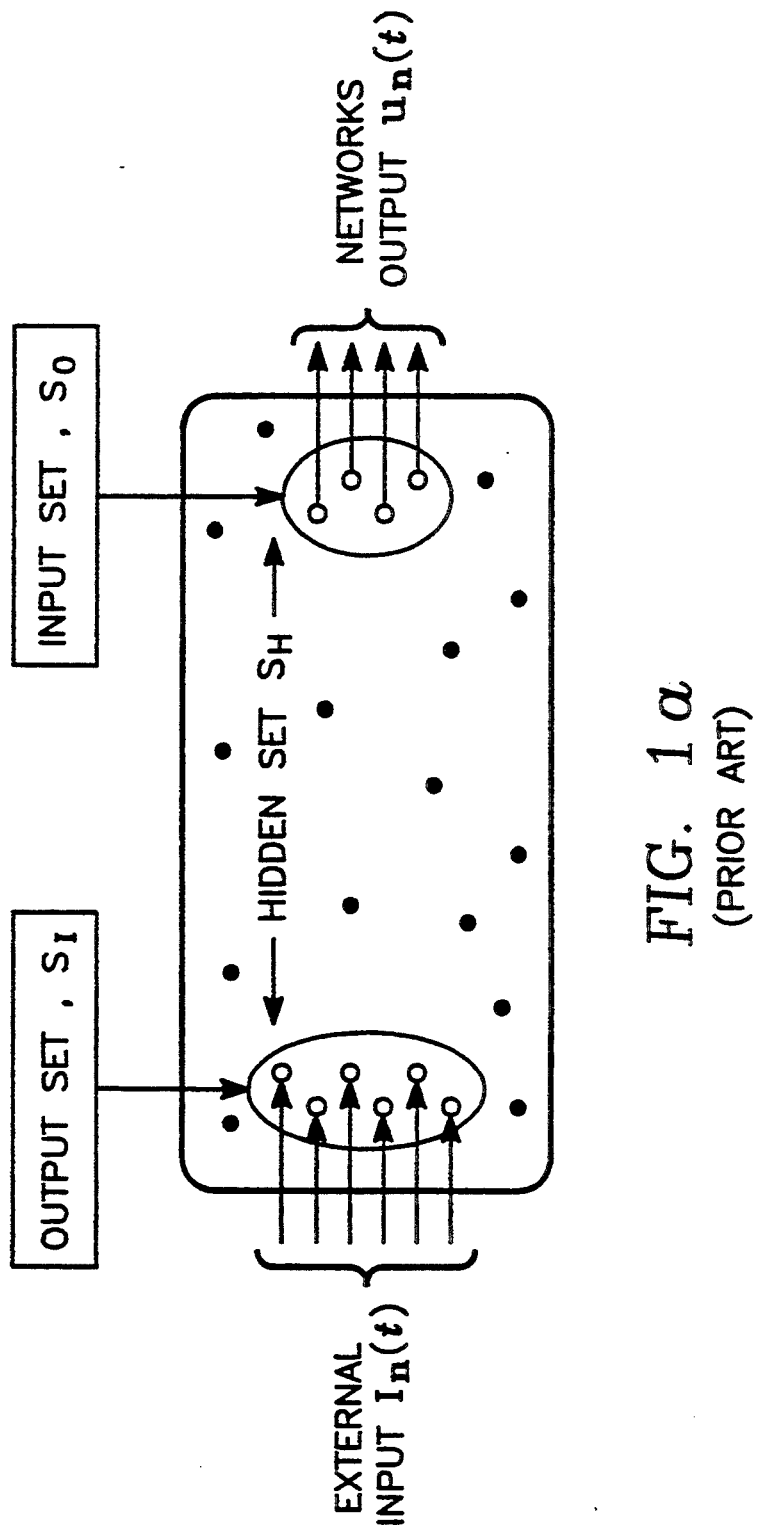
FIG. 1a is a diagram of a neural network of the prior art.

Temporal Learning Framework:

We formalize a neural network as an adaptive dynamical system whose temporal evolution is governed by the following set of coupled nonlinear differential equations:

$$\dot{u}_n + \kappa_n u_n = g_n\left[\gamma_n\left(\sum_m T_{nm} u_m + I_n\right)\right] t > 0 \quad (1)$$

where $u_n$ represents the output of the nth neuron ($u_n(0)$ being the initial state), and $T_{nm}$, denotes the strength of the synaptic coupling from the m-th to the n-th neuron. The constants $\kappa_n$ characterize the decay of neuron activities. The sigmoidal functions $g_n(\cdot)$ modulate the neural responses, with gain given by $\gamma_n$; typically, $g_n(\gamma_n x) = \tanh(\beta_n x)$. In order to implement a nonlinear functional mapping from an $N_I$-dimensional input space to an $N_O$-dimensional output space, the neural network is topographically partitioned into three mutually exclusive regions. As shown in FIG. 1a, the partition refers to a set of input neurons $S_I$, a set of output neurons $S_O$, and a set of "hidden" neurons $S_H$. Note that this architecture is not formulated in terms of "layers" and that each neuron may be connected to all others including itself.

Let $\bar{a}(t)$ (the overhead bar denotes a vector) be an N-dimensional vector of target temporal patterns, with non zero elements, $a_n(t)$, in the input and output sets only. When trajectories, rather than mappings, are considered, components in the input set may also vanish. Hence, the time- dependent external input term in Eq. (1), i.e., $I_n(t)$, encodes component-contribution of the target temporal pattern via the expression $$I_n(t) = \begin{cases} a_n(t) & \text{if } n \in S_I \\ 0 & \text{if } n \in S_H \cup S_O \end{cases} \quad (2)$$

To proceed formally with the development of a temporal learning algorithm, we consider an approach based upon the minimization of an error functional, E, defined over the time interval $[t_o, t_f]$ by the following expression $$E(\bar{u}, \bar{p}) = \int_{t_o}^{t_f} \frac{1}{2} \sum_n e_n^2 \, dt = \int_{t_o}^{t_f} F \, dt \quad (3)$$

where the error component, $e_n(t)$, represents the difference between the desired and actual value of the output neurons, i.e., $$e_n(t) = \begin{cases} a_n(t) - u_n(t) & \text{if } n \in S_O \\ 0 & \text{if } n \in S_I \cup S_H \end{cases} \quad (4)$$

In our model, the internal dynamical parameters of interest are the strengths of the synaptic interconnections, $T_{nm}$, the characteristic decay constants, $\kappa_n$, and the gain parameters, $\gamma_n$. They can be represented as a vector of M [where: $M = N^2 + 2N$] components $$\bar{p} = \}T_{11}, \ldots, T_{NN}, \kappa_1, \ldots \kappa_N, \gamma_1, \ldots, \gamma_N\} \quad (5)$$

We will assume that the elements of $\bar{p}$ are statistically independent. Furthermore, we will also assume that, for a specific choice of parameters and set of initial conditions, a unique solution of Eq. (1) exists. Hence, the state variables $\bar{u}$ are an implicit function of the parameters $\bar{p}$. In the rest of this paper, we will denote the $\mu^{th}$ element of the vector $\bar{p}$ by $p_\mu$ ($\mu = 1, \ldots, M$).

Traditionally, learning algorithms are constructed by invoking Lyapunov stability arguments, i.e., by requiring that the error functional be monotonically decreasing during learning time, $\tau$. This translates into $$\frac{dE}{d\tau} = \sum_{\mu=1}^{M} \frac{dE}{dp_\mu} \cdot \frac{dp_\mu}{d\tau} < 0 \quad (6)$$

One can always choose, with $\eta > 0$ $$\frac{dp_\mu}{d\tau} = -\eta \frac{dE}{dp_\mu} \quad (7)$$

which implements learning in terms of an inherently local minimization procedure. Attention should be paid to the fact that Eqs. (1) and (7) may operate on different time scales, with parameter adaptation occurring at a slower pace. Integrating the dynamical system, Eq.(7), over the interval $[\tau, \tau + \Delta\tau]$, one obtains, $$p_\mu(\tau + \Delta\tau) = p_\mu(\tau) - \eta \int_\tau^{\tau + \Delta\tau} \frac{dE}{dp_\mu} d\tau \quad (8)$$

Equation (8) implies that, in order to update a system parameter $p_\mu$, one must evaluate the "sensitivity" (i.e., the gradient) of E, Eq. (3), with respect to $p_\mu$ in the interval $[\tau, \tau + \Delta\tau]$. Furthermore, using Eq. (3) and observing that the time integral and derivative with respect to $p_\mu$, commute, one can write $$\frac{dE}{dp_\mu} = \int_{t_o}^{t_f} \frac{dF}{dp_\mu} dt = \int_{t_o}^{t_f} \frac{\partial F}{\partial p_\mu} dt + \int_{t_o}^{t_f} \frac{\partial F}{\partial \bar{u}} \cdot \frac{\partial \bar{u}}{\partial p_\mu} dt \quad (9)$$

This sensitivity expression has two parts. The first term in the Right Hand Side (RHS) of Eq.(9) is called the "direct effect", and corresponds to the explicit dependence of the error functional on the system parameters. The second term in the RHS of Eq. (9) is referred to as the "indirect effect", and corresponds to the implicit relationship between the error functional and the system parameters via $\bar{u}$. In our learning formalism, the error functional, as defined by Eq. (3), does not depend explicitly on the system parameters; therefore, the "direct effect" vanishes, i.e., $$\frac{\partial F}{\partial p_\mu} = 0 \quad (10a)$$

Since F is known analytically (viz. Eqs. (3) and (4)), computation of $\partial F/\partial \bar{u}$ is straightforward. Indeed $$\frac{\partial F}{\partial u_n} = -e_n \quad (10b)$$

Thus, to enable evaluation of the error gradient using Eq. (9), the "indirect effect" matrix $\partial \bar{u}/\partial \bar{p}$ should, in principle, be computed.

TEACHER FORCING

Figure 1B:
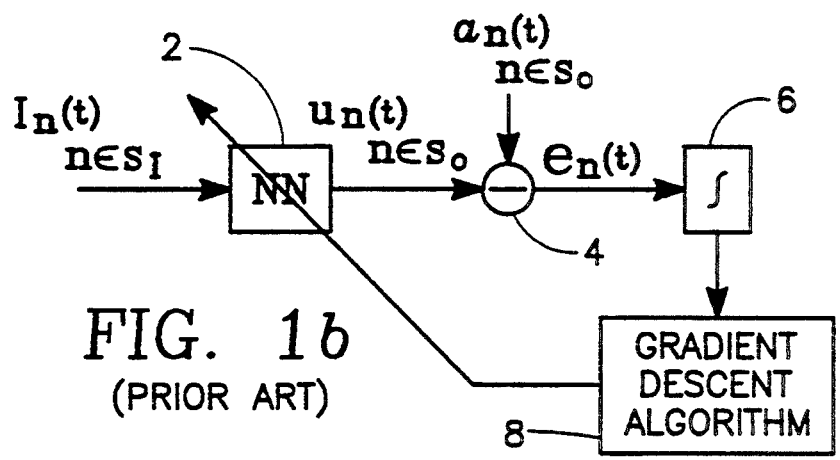
FIG. 1b a diagram of a neural network training architecture of the prior art.

The neural activation dynamics specified by Eqs. (1) and (2) does not include explicit information regarding the desired network output. If these equations are used in conjunction with the learning formalism described in the previous section, the network parameters (i.e., the elements of $\bar{p}$) will be modified at the end of a trajectory, i.e., at time $t_f$, as shown schematically in FIG. 1b. Such a parameter adaptation is based upon the total error between the desired and the actual output of the network, accumulated over the interval $[t_o, t_f]$. Referring to FIG. 1b, a neural network 2 is stimulated by a time-varying training vector I(t) to produce a time-varying output vector u(t). A subtractor 4 subtracts the output vector u(t) from a time-varying target vector a(t) to produce a time-varying error vector e(t). An integrator 6 integrates the error vector e(t) over the time period of the time-varying training vector I(t). At the end of the time period, the result of this integration is used by a gradient descent algorithm to change the parameters (e.g., the synapse weights) of the neural network in such a manner as to reduce the output of the integrator 6 in the next time period. In our earlier analogy to real-life behavior, this would correspond to a parent staying home, letting his child ride a bicycle and, after each trial, telling him all the errors he made. "Conventional" supervised learning operates in this fashion, and usually takes a great deal of iterations to produce the desired results.

Figure 2:
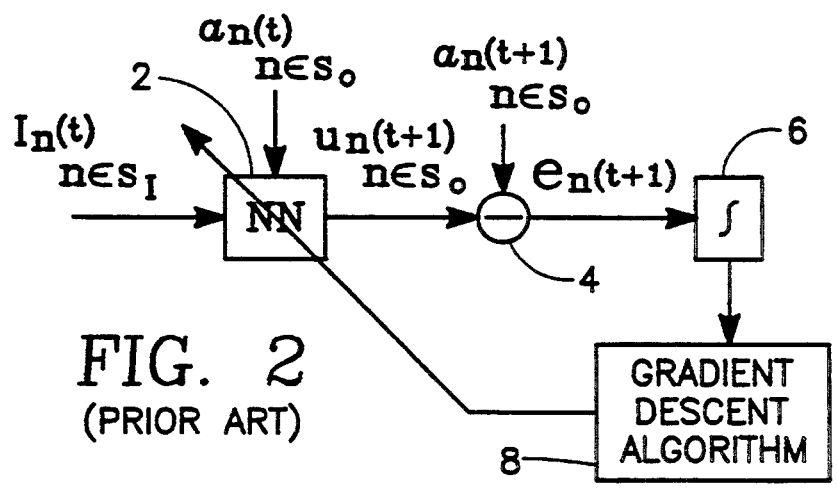
FIG. 2 is a diagram of a neural network numerical training architecture of the prior art including error feedback which nulls the error at each numerical step.
Figure 3:
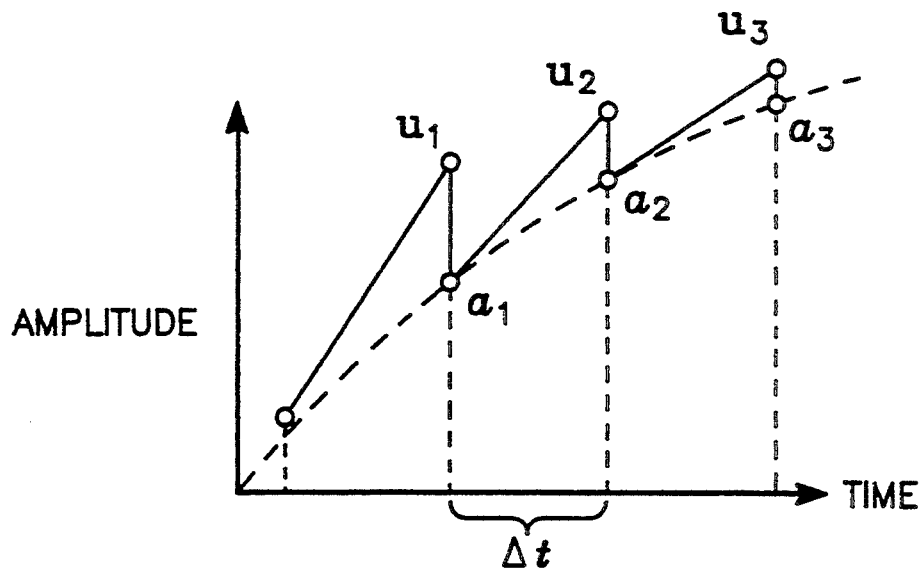
FIG. 3 is a time domain diagram illustrating the behavior of the neural network training architecture of FIG. 2.

In order to overcome this difficulty, we consider the concept of teacher forcing, i.e., driving the output neurons to desired values in finite time. Williams and Zipser [Williams, R. J., and Zipser, D. (1988) "A learning algorithm for continually running fully recurrent neural networks," Technical Report ICS Report 8805, UCSD, La Jolla, Calif. 92093] disclose forcing in a similar context. Their focus, however, is on discrete time problems. To highlight the differences between the two approaches we make the following observations. By definition, the conventional output of a network at time step (t+1), without teacher forcing, is a function of the external inputs to the network and of the networks'-states at time step (t), i.e., in our notation, $u_n(t+1) = g_n[I_i(t), u_j(t), \bar{p}]$ where $n \in S_O$, $i \in S_I$ and $j \in S_I \cup S_H \cup S_O$. To introduce teacher forcing, Williams and Zipser replace the output of the network with the desired output values at time step (t). This means that $u_n(t+1) = g_n[I_i(t), u_j(t), a_n(t), \bar{p}]$ where $n \epsilon S_O$, $i \epsilon S_I$ and $j \epsilon S_I \cup S_H$. The network parameters can be updated either at the end of each time step, or at the end of the trajectory, i.e., at time $t_f$. A schematic block diagram of this model, in which the parameters are updated at the end of the trajectory, is given in FIG. 2. Referring to FIG. 2, at time t the neural network is "forced" to an output vector equal to the current target vector a( t ). The neural network then responds to the current training vector I(t) to produce an output vector u(t+1) at the next time step t+1. The subtractor 4 subtracts the output vector u(t+1) from the target vector a(t+1) of the next time step t+1 to produce an error vector e(t+1). Thereafter, the operation of the model of FIG. 2 is analogous to that of FIG. 1b. The temporal behavior of this model is illustrated in FIG. 3, in which the neuron outputs are forced to the training target (zero-error) values at the end of each time step. Since the network outputs, $u_n(t+1)$, $n \epsilon S_O$, are dependent upon the desired values $a_n(t)$ of the network outputs at time step t, the algorithm can be interpreted as training the network to capture the velocity of given points on the trajectory, rather than the trajectory itself. In our earlier analogy, each time interval may be viewed as a learning session at the end of which the parent, is correcting the child's performance.

Figure 4:
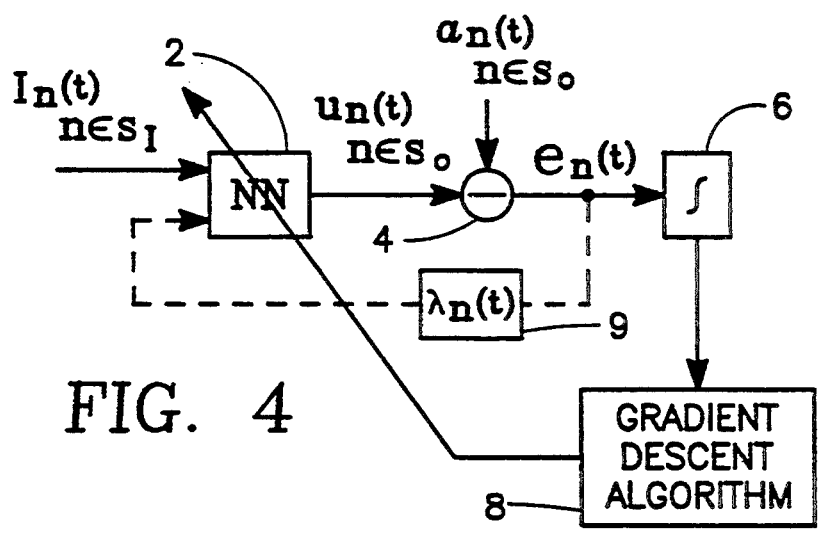
FIG. 4 is a simplified diagram of a neural network training architecture embodying the present, invention.

The teacher forcing paradigm of the present invention, on the other hand, stems from feedback control. In such a scheme, with continuous network dynamics, the error between the actual and the desired outputs is fed back, as inputs to the network output set neurons. A schematic block diagram of the invention is presented in FIG. 4. Referring to FIG. 4, on a simplistic level the operation of the invention is analogous to the model of FIG. 1b discussed above. However, the invention modifies the error vector e(t) by a function $\lambda(t)$ and feeds the modified error vector back to the neural network 2 in real time. Preferably, this feedback is applied directly to the inputs of the array of output neurons of the neural network 2. As can be seen, the parameters of the network are updated based upon the error accumulated over the length of the trajectory, i.e., over the interval $[t_o, t_f]$. Again, by analogy, this scheme corresponds to a parent accompanying his child and holding the bicycle during the trajectory, to keep him on the right track as much as possible. At the end of the trajectory the parent would explain to his child what went wrong and where, so that corrective action can be taken for the next round. In order to incorporate this teacher forcing into the neural learning formalism presented earlier, the time-dependent input to the neural activation dynamics, Eq.(1), i.e., $I_n(t)$ as given by Eq. (2), is modified to read:

$$I_n(t) = \begin{cases} a_n(t) & \text{if } n \epsilon S_I \\ 0 & \text{if } n \epsilon S_H \\ \lambda [a_n(t)]^{1-\beta}[a_n(t) - u_n(t)]^\beta & \text{if } n \epsilon S_O \end{cases} \quad (11)$$

At this stage, $\lambda$ and $\beta$ are assumed to be positive constants. The purpose of the term $[a_n(t)]^{1-\beta}$ is to insure that $I_n(t)$ has the same dimension as $a_n(t)$ and $u_n(t)$. It (1989) has been demonstrated that in general, for $\beta=(2i+1)/(2j+1)$, $i<j$ and i and j strictly positive integers, an expression of the form $[a_n-u_n]^\beta$ induces a terminal attractor phenomenon for the dynamics described be Eq. (1). Barhen et al. [Barhen, J., Toomarian, N. and Gulati, S. (1990) "Adjoint operator algorithms for faster learning in dynamical neural networks," in David S. Touretzky (Ed.), *Advances in Neural Information Processing Systems,* Vol. 2, pp. 498–508, San Mateo, Calif. (Morgan Kaufmann); and, Barhen, J., Toomarian, N. and Gulati, S. (1990) "Application of adjoint operators to neural learning," *Applied Mathematical Letters,* Vol. 3, No. 3, pp. 13–18] have considered terminal attractor dynamics induced from the input set, rather than the output set, $S_O$. They have observed that such a dynamics enables to learn time-independent mappings much faster than backpropagation. This provided the motivation for choosing $\beta=7/9$ for the numerical simulations described below in this specification. Simulations with other positive constants, such as $\beta=1$, have produced, qualitatively, similar results, albeit over a longer training period. A study of the sensitivity of the results to the choice of $\beta$ is beyond the scope of this specification.

When learning is successfully completed [i.e., $e_n(t)=0$], teacher forcing will vanish, and the network will revert to the conventional dynamics given by Eqs. (1) and (2). However, there might be instances where the error functional can not be reduced to zero, implying that the teacher forcing term will not vanish as learning proceeds. Thus, a discrepancy in results between the learning and recall mode of the network should be expected. In an attempt to overcome this problem, we recall another lesson from life. When a parent teaches his child to ride a bicycle, at early stages he keeps his hands on the bicycle, accompanying the child. However, as soon as the child shows some learned skills in controlling himself, the parent will take his hands off more and more often, to let the child ride independently. In this vein, the teacher's intervention in the learning process preferably decreases as learning progresses. Specifically, in Equation (1) $\lambda$ may be modulated in time as function of the error functional, according to $$\lambda(\tau) = 1 - e^{-E(\tau)} \quad (12)$$

The above expression should be understood as indicating that, while $\lambda$ varies on the learning time scale, it remains at essentially constant levels during the iterative passes over the interval $[t_o, t_f]$.

Figure 5:
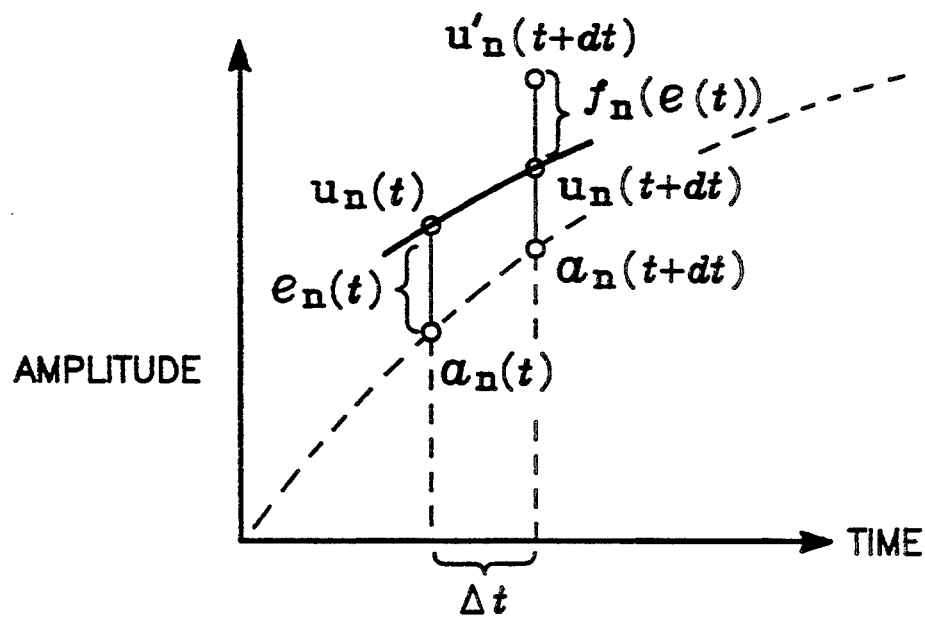
FIG. 5 is a time domain diagram illustrating the behavior of the neural network training architecture of FIG. 4.

The behavior in a time continuum of the neural network in the training architecture of FIG. 4 is illustrated in FIG. 5, in accordance with the temporal evolutionary behavior defined by equation (1). At a given time t, the output of a given output neuron is u(t) while the target value for that neuron is a(t), which differs from the actual neuron output by an error e(t). The feedback of the error e(t), illustrated in FIG. 4, reduces the error at the next time differential, t+dt, by an amount fie(t)]- which is a function of the error e(t). Thus, without the invention, the neuron output at the next time differential t+dt would have been u'(t+dt), but with the invention the error at t+dt is reduced by f[e(t)] to produce a neuron output u(t+dt) which is closer to the target output a(t+dt). The overall result is that the total error $E(\tau)$ of equation (3) is reduced. In accordance with equation (12), the amount of correction, namely the proportion of the error e(t) fed back to the output neuron, is reduced as the total error $E(\tau)$ of equation (3) is reduced at the end of each learning cycle of time duration $\Delta \tau = [t_o, t_f]$.

A significant advantage of the invention is that it works in the time continuum of the differential equation of Equation (3), while the technique of FIGS. 2 and 3 is a numerical simulation not realizable using analog neurons.

Figure 6:
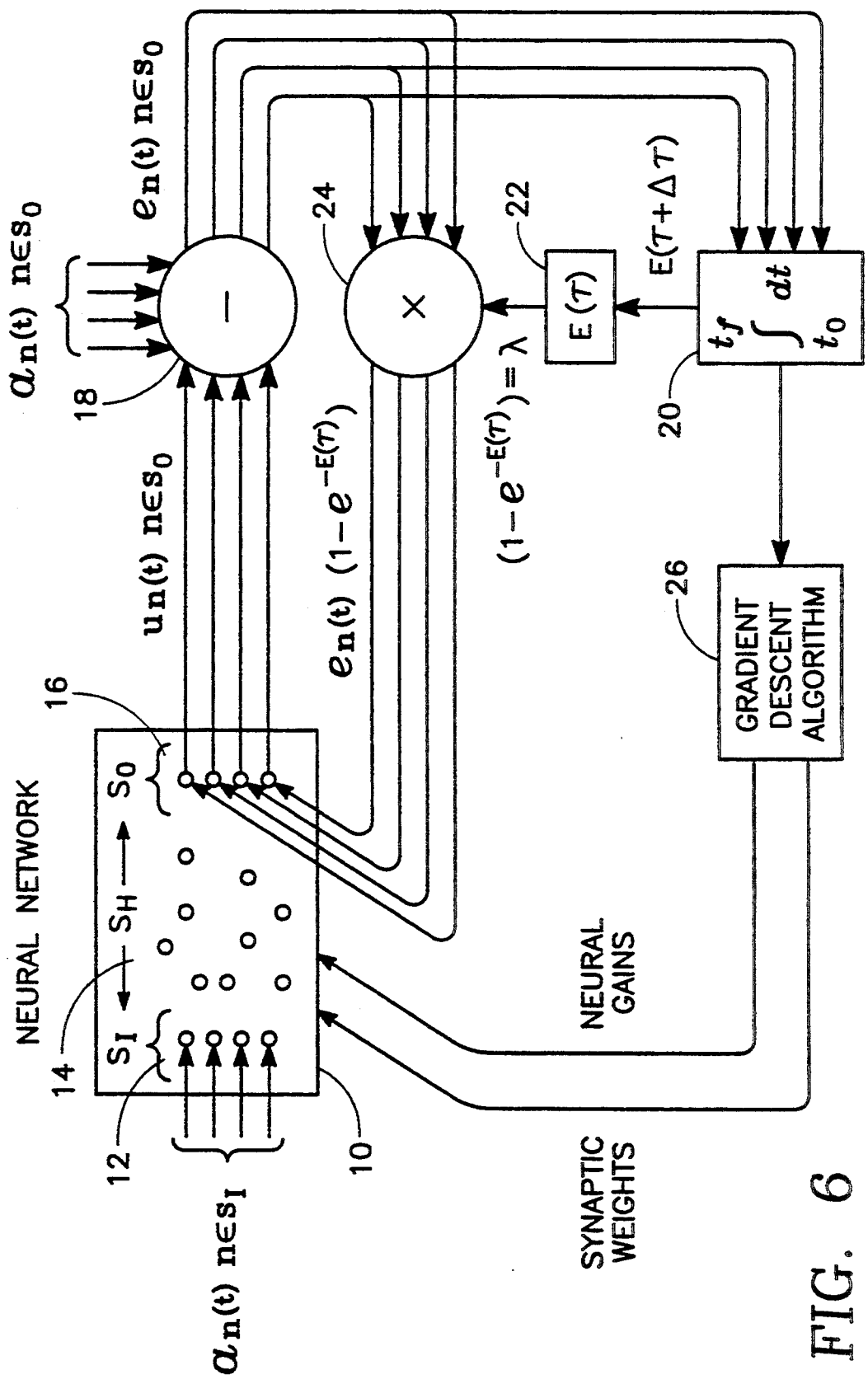
FIG. 6 is a system diagram corresponding to the neural network training architecture of FIG. 4.

FIG. 6 illustrates a very tutorial example corresponding to the architecture of FIG. 4, in which the error e(t) reduced by a factor of 1-exp[E($\tau$)] is directly fed back to the inputs of the output neurons. As shown in FIG. 6, the neural network 10 includes a set of input neurons 2, a set of hidden neurons 14 and a set of output neurons 16. The neurons 12, 14, 16 are selectively interconnected through weighted synapses (not shown in FIG. 6) whose weights are determined, along with the gains of the neurons, during a preliminary training exercise. During this exercise, a training set of time-dependent neuron inputs are applied during a predetermined time interval to the inputs of the input neurons 12 which produces a set of neuron outputs u(t). An error vector e(t) is determined by a subtractor IS subtracting the vector of neuron outputs u(t) from the vector of target neuron outputs a(t). All elements of the error vector e(t) are squared and summed and integrated over the predetermined time interval by the integrator 20 to produce the total error E($\tau$) of Equation 3 at the end of the current training cycle, which is stored in a register 22. A multiplier 24 multiplies each component of the error vector e(t) by the factor 1-exp[E($\tau$)], and the product is applied as feedback to the input, of the corresponding output neuron 16. A conventional gradient, descent, algorithm 26, using the output of the integrator 20 and the current values of the neuron gains and synaptic weights of the neural network 10, computes the desired changes to the gains and weights at the end of the predetermined time interval, which are then implemented in the neural network 10. The process is then repeated in successive cycles with a cyclic period equal to the predetermined time interval, until the total error E($\tau$) reaches zero.

Figure 7:
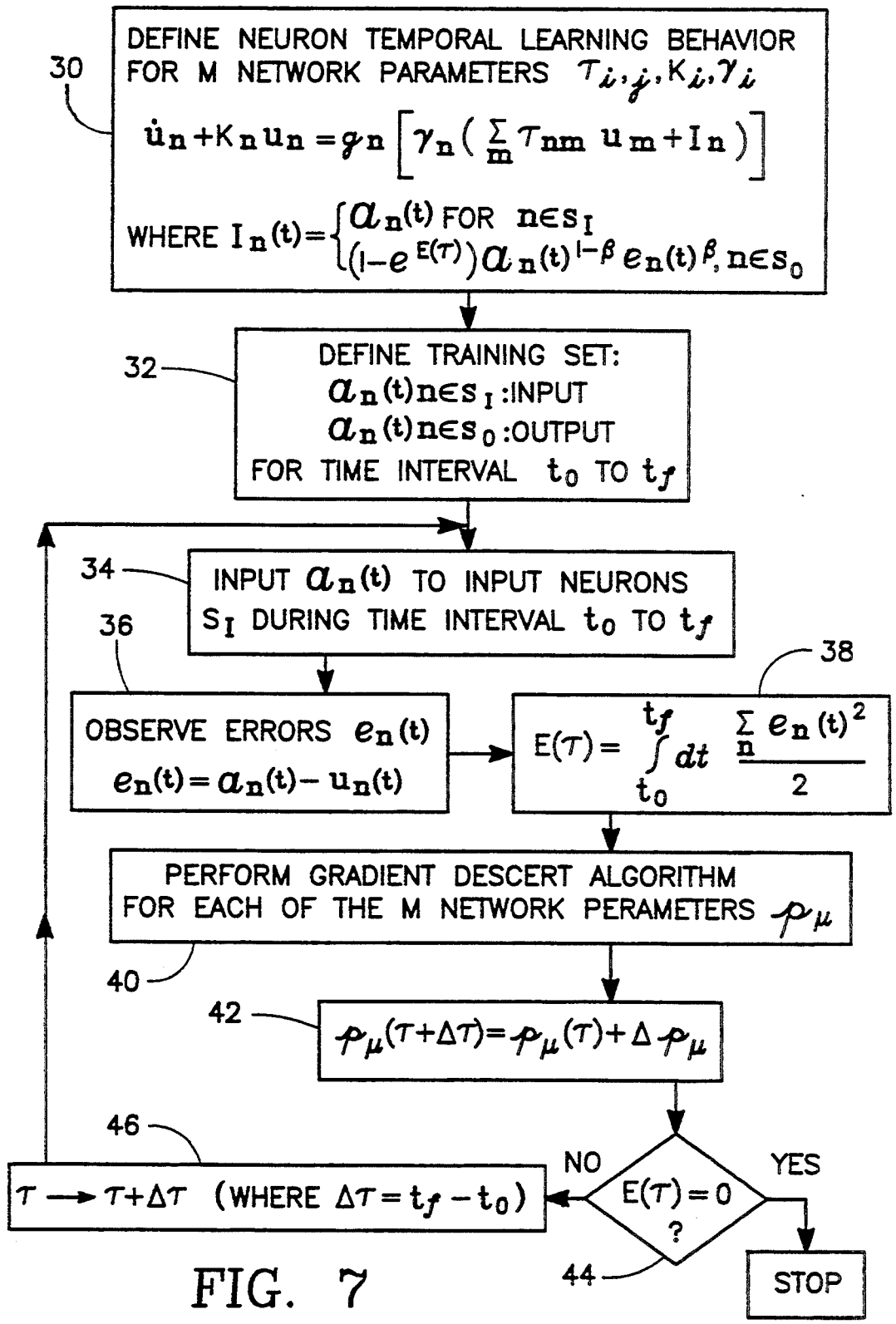
FIG. 7 is a flow diagram illustrating the operation of the neural network training architecture of FIG. 4 using a generic gradient descent algorithm for computing the neural network parameter changes during training.

The operation of the system of FIG. 6 is illustrated in FIG. 7. Preliminarily, the neuron temporal behavior during the evolutionary learning process is defined by the differential equation of Equation (1) (block 30 of FIG. 7) and a training set is defined for the inputs to the input neurons 12 and for target outputs of the output neurons 16 (block 32 of FIG. 7). The training set neuron inputs are time dependent functions over the predetermined time interval. Next., the training set neuron inputs are applied to the inputs of the input neurons 12 for the predetermined time interval $\Delta\tau = [t_o, t_f]$ (block 34 of FIG. 7) while the errors e(t) between the outputs of the output neurons 16 and the desired target outputs are monitored (block 36). The squares of the errors are summed and integrated over the predetermined time period (block 38) to produce the total error E($\tau$) for the current learning cycle. The gradient descent algorithm is then performed (block 40) to compute the changes to each of the neural network parameters (e.g., neural gains and synaptic weights), and these changes are then added to the corresponding neural network parameters (block 42). If the total error E($\tau$) of the current learning cycle is zero (or below some predetermined threshold), then the training session is finished (YES branch of block 44). Otherwise (NO branch of block 44), the system proceeds to the next learning cycle (block 46) and the process is repeated starting at block 34 of FIG. 7.

Figure 8:
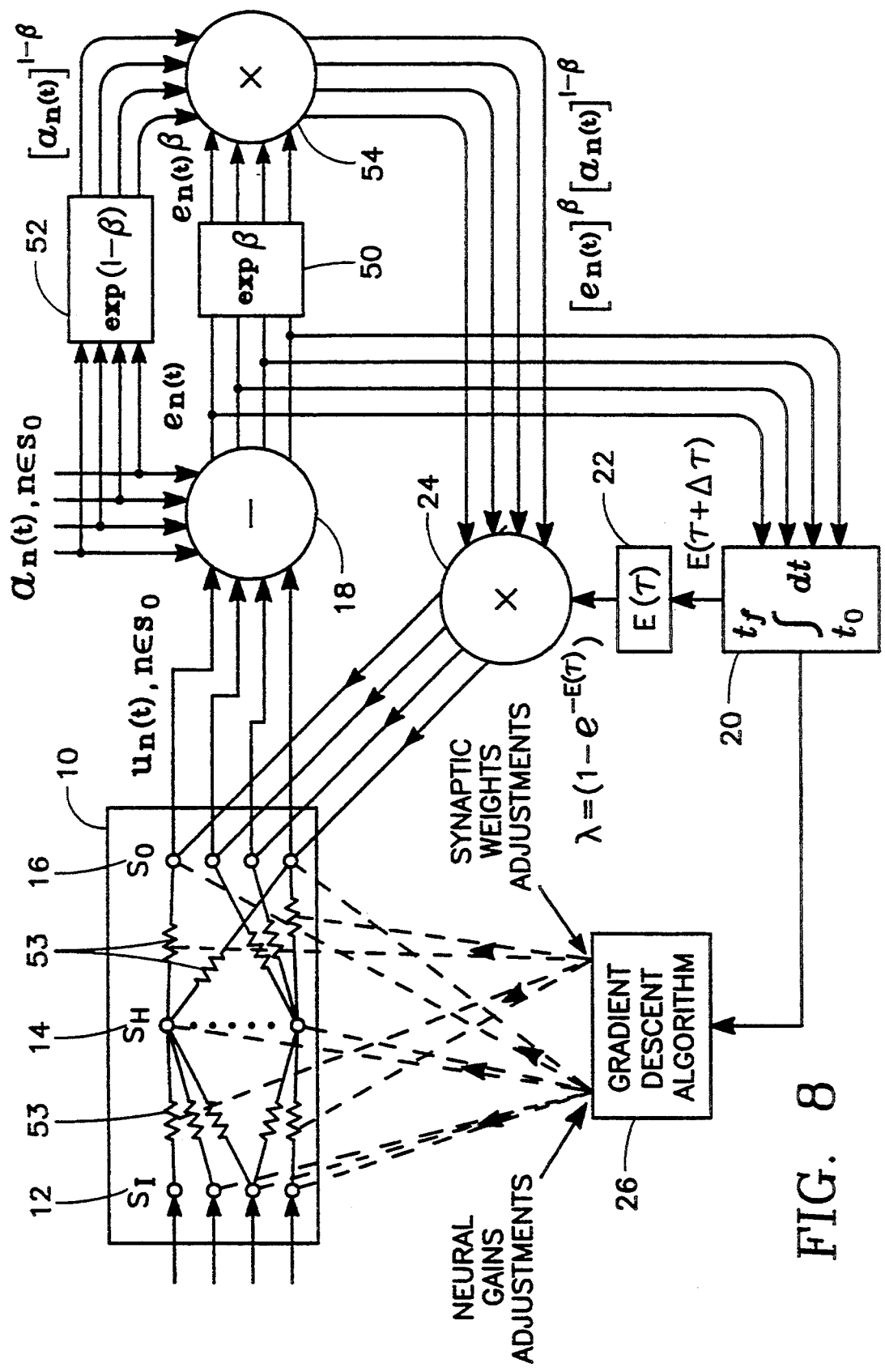
FIG. 8 is a system diagram illustrating a preferred embodiment of the system of FIG. 5.

The preferred embodiment of the invention is illustrated in FIG. 8. In FIG. 8, the error e(t) is scaled before being applied as feedback to the neural network 10. First, the error e(t) is raised to a selected exponential power $\beta$ by a processor 50, while the target output a(t) is raised to a complementary exponential power $1-\beta$ by a processor 52. The results are combined by a multiplier 54 and the product is input to the multiplier 24. The gradient descent, algorithm 26 transmits neural gain adjustments to the neurons 12, 14, 16 and transmits synaptic weight adjustments to the synapses 53 in order to adjust the neuron gains and synapse weights at the end of each time interval. The gradient descent algorithm computes these adjustments based upon the output of the integrator 20 in a well-known manner. The skilled worker may devise various alternative techniques for scaling e(t) depending upon the specific application of the invention.

GRADIENT DESCENT ALGORITHMS

The efficient computation of system response sensitivities (e.g., error functional gradients) with respect to all parameters of a network's architecture plays a critically important role in neural learning. As mentioned previously herein, the gradient descent, algorithm 26 may be any suitable gradient descent algorithm of the prior art. The following describes how one of the best gradient descent algorithms is employed in the invention.

Direct Approach Gradient Descent Algorithm

Let us differentiate the activation dynamics, Eq. (1), including the teacher forcing, Eq. (11), with respect to $p_\mu$. We observe that the time derivative and partial derivative with respect to $p_\mu$ commute. Using the shorthand notation $\partial(\ldots)/\partial p_\mu = (\ldots)_{,\mu}$, we obtain a set of equations referred to as "Forward Sensitivity Equations" (FSEs):

$$\begin{cases} u_{n,\mu} + \Sigma_m A_{nm} u_{m,\mu} = S_{n,\mu} & t > 0 \\ u_{n,\mu} = 0 & t = 0 \end{cases} \quad (13)$$

in which $$A_{nm} = (\kappa_n - \gamma_n g'_n \partial I_n/\partial u_n)\delta_{nm} - \gamma_n g'_n T_{nm} \quad (14)$$

$$S_{n,\mu} = \quad (15)$$

$$-u_n \delta_{p_\mu,\kappa_n} + \gamma_n g'_n \sum_m u_m \delta_{p_\mu,T_{nm}} + g'_n \left(\sum_m T_{nm} u_m + I_n\right)\delta_{p_\mu,\gamma_n}$$

In the above expressions, $g_{n'}$ represents the derivative of $g_n$ with respect to its arguments, $\delta$ denotes the Kronecker symbol and $S_{n,\mu}$ is defined as a nonhomogeneous "source". The source term contains all explicit derivatives of the neural activation dynamics, Eq. (1), with respect to the system parameters, $p\mu$. Hence, it is parameter dependent and its size is (N×M). The initial conditions of the activation dynamics, Eq.(1), are excluded from the vector of system parameters $\overline{p}$. Thus, the initial conditions of the FSEs will be taken as zero. Their solution will provide the matrix $\partial \overline{u}/\partial \overline{p}$ needed for computing the "indirect effect" contribution to the sensitivity of the error functional, as specified by Eq. (9). This gradient descent algorithm is, essentially, similar to the scheme proposed in the above-referenced publication by Williams and Zipset (1989). Computation of the gradients using the forward sensitivity formalism requires solving Eq. (13) M times, since the source term, $S_{n,\mu}$, explicitly depends on $p_\mu$. This system has N equations, each of which requires multiplication and summation over N neurons. Hence, the computational complexity, measured in terms of multiply-accumulates, scales like $N^2$ per system parameter, per time step. Let us assume, furthermore, that the interval $[t_0, t_f]$ is discretized into L time steps. Then, the total number of multiply-accumulate operations scales like $N^4L$. Clearly, such a scheme exhibits expensive scaling properties, and would not be very practical for large networks. On the other hand, since the FSEs are solved forward in time, along with the neural dynamics, the method also has inherent advantages. In particular, there is no need for a large amount of memory. Since $u_{n,\mu}$ has $N^3+2N^2$ components, the storage requirement scales as $O(N^3)$.

Figure 9A:
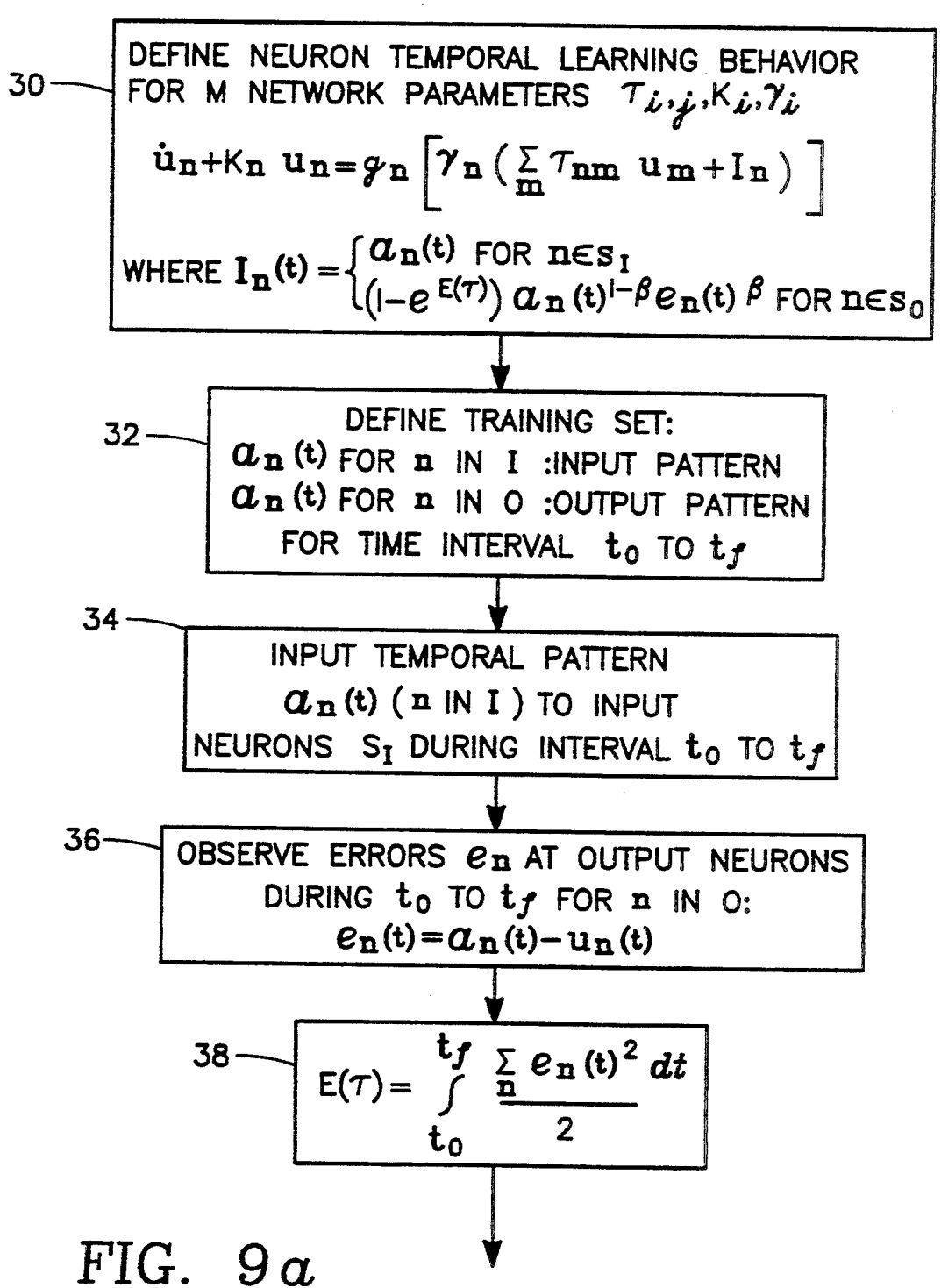
FIGS. 9a and 9b together constitute a flow diagram illustrating the operation of the neural network training architecture of FIG. 4 for an embodiment employing a particular type of conventional gradient descent algorithm.
Figure 9B:
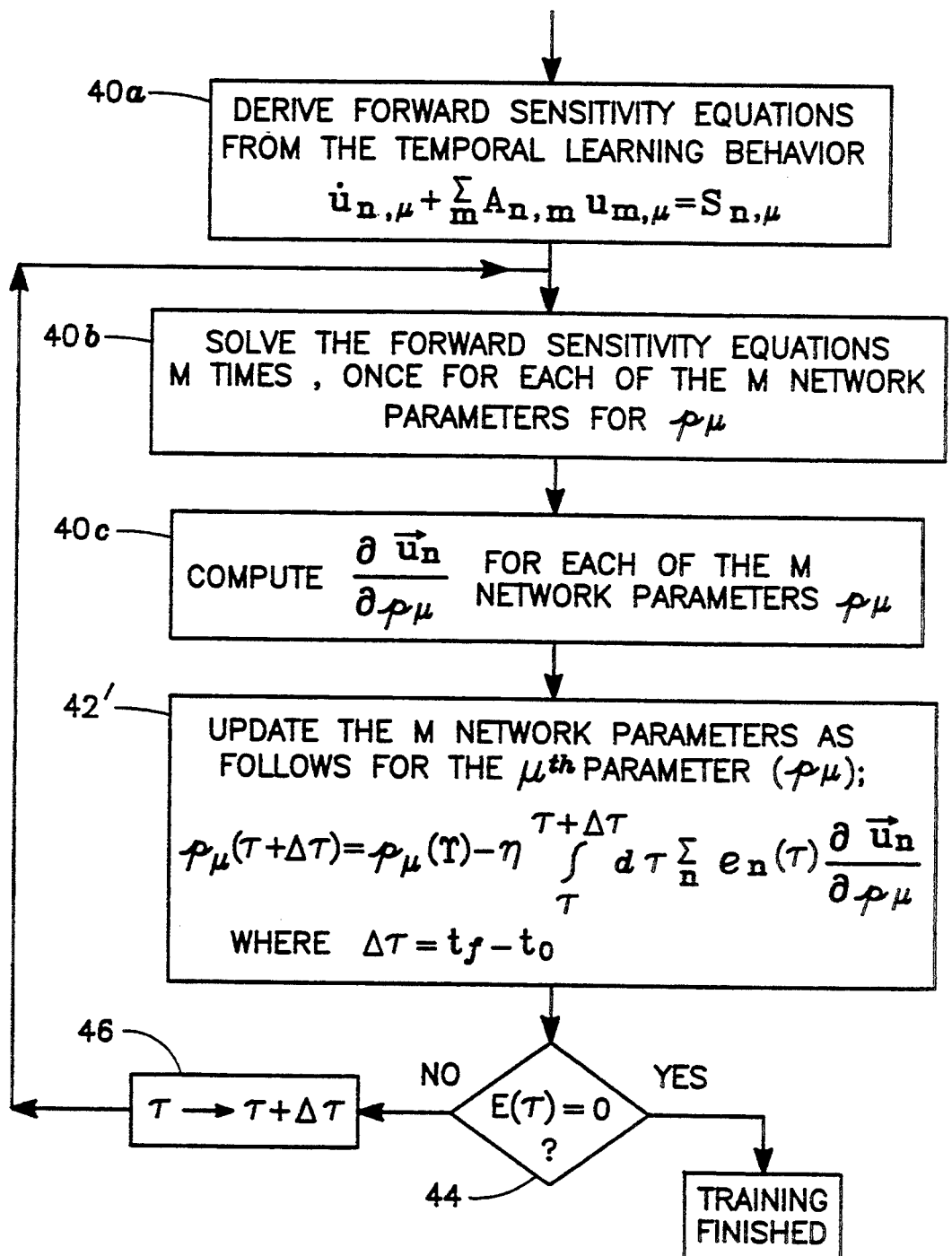

If the foregoing is employed for the gradient descent algorithm 26 of FIG. 6, then the step of performing a gradient descent algorithm of FIG. 7 (block 40 of FIG. 7) may be broken into steps 40a, 40b and 40c as illustrated in FIG. 9b. Specifically, the first step (block 40a of FIG. 9b) of the gradient descent algorithm 26 is to derive the forward sensitivity equations (Equations 13–15) from the neural learning behavior (Equation 1). The next step is to solve the forward sensitivity equations once for each of the M neural network parameters (block 40b of FIG. 9b). The third step (block 40c of FIG. 9b) is to compute the partial derivative of each neuron output u(t) with respect to each of the M network parameters. Finally, the computation step of block 42' of FIG. 9b employs the integral of this derivative to compute the change to the corresponding network parameter at the end of the current learning cycle.

NUMERICAL SIMULATIONS

The embodiment of FIG. 8 has been applied to the problem of learning two trajectories: a circle and a figure eight in computer simulations. Results of applying prior art techniques to these problems can be found in the literature, and they offer sufficient complexity for illustrating the computational efficiency of our proposed formalism.

In the following computer simulations, the network that was trained to produce these trajectories using the present invention involved 6 fully connected neurons, with no input, 4 hidden and 2 output units. An additional "bias" neuron was also included. In these simulations, the dynamical systems were integrated using a first order finite difference approximation. The neuron sigmoidal nonlinearity was modeled by a hyperbolic tangent. Throughout, the decay constants $\kappa_n$, the neural gains $\gamma_n$, and $\lambda$ were set to one. Furthermore, $\beta$ was selected to be 7/9. For the learning dynamics, $\Delta\tau$ was set to 6.3 and $\eta$ to 0.015873. The two output units were required to oscillate according to $$a_5(t) = A \sin \omega t \quad (16a)$$

$$a_6(t) = A \cos \omega t \quad (16b)$$

for the circular trajectory, and, according to $$a_5(t) = A \sin \omega t \quad (17a)$$

$$a_6(t) = A \sin 2\omega t \quad (17b)$$

for the figure eight trajectory. Furthermore, we took A=0.5 and $\omega$=1. Initial conditions were defined at $t_O$=0. Plotting $a_5$ versus $a_6$ produces the "desired" trajectory. Since the period of the above oscillations is $2\pi$, $t_f = 2\pi$ time units are needed to cover one cycle. We selected $\Delta t$=0.1, to cover one cycle in approximately 63 time steps.

Circular Trajectory

In order to determine the capability and effectiveness of the algorithm, three cases were examined. As initial conditions, the values of $u_n$ were assumed to be uniform random numbers between $-0.01$ and $0.01$ for the simulation studies referred in the sequel as "Case—1" and "Case—2". For Case—3, we set $u_n$ equal to zero, except $u_6$ which was set to 0.5. The synaptic interconnections were initialized to uniform random values between $-0.1$ and $+0.1$ for all three experiments.

CASE—1

Figure 10:
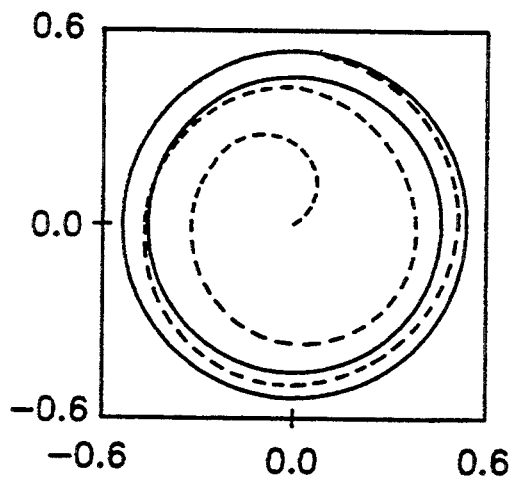
FIGS. 10, 11 12 illustrate different simulation results of a neural network learning a circular motion using the invention.
Figure 13:
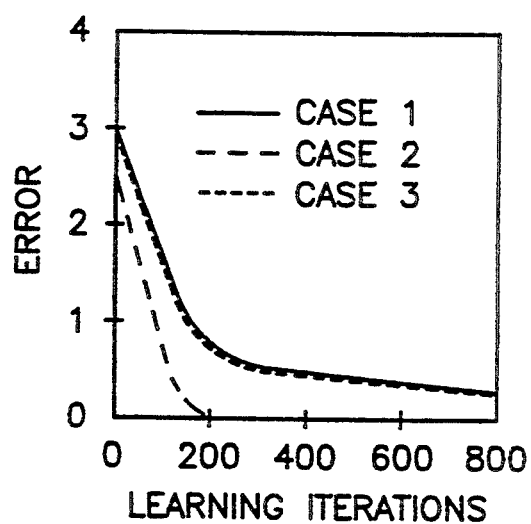
FIG. 13 is a graph of the error as a function of the number of learning iterations for each of the cases illustrated in FIGS. 10–12.

The training was performed over $t_f$=6.5 time units (i.e., 65 time intervals). A maximum number of 500 iterations was allowed. The results shown in FIG. 10 were obtained by starting the network with the same initial conditions, $u_n(0)$, as used for training, the learned values of the synaptic interconnections, $T_{nm}$, and with no teacher forcing ($\lambda$=0). As we can see, it takes about 2 cycles until the network reaches a consistent trajectory. Despite the fact that the system's output was plotted for more than 15 cycles, only the first 2 cycles can be distinguished. FIG. 13 demonstrates that most of the learning occurred during the first 300 iterations.

CASE—2

Figure 11:
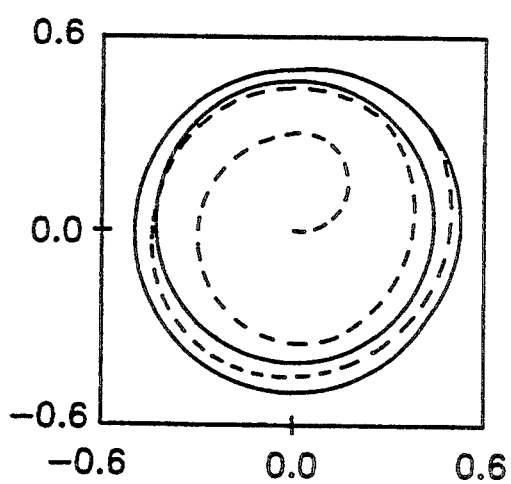

Here, we decided to increase the length of the trajectory gradually. A maximum number of 800 learning iterations was now allowed. The length of the training trajectory was 65 time intervals for the first 100 iterations, and increased every 100 iterations by 10 time intervals. Therefore, it was expected that the error functional would increase whenever the length of the trajectory was increased. This was indeed observed, as may be seen from the learning graph, shown in FIG. 13. The output of the trained network is illustrated in FIG. 11. Here again, from 15 recall cycles, only the first two (needed to reach the steady orbit) are distinguishable and the rest overlap. Training using greater trajectory lengths yielded a recall circle much closer to the desired one than in the previous case. From FIG. 13, one can see that the last 500 iterations did not enhance dramatically the performance of the network. Thus, for practical purposes, one may stop the training after the first 300 iterations.

CASE—3

Figure 12:
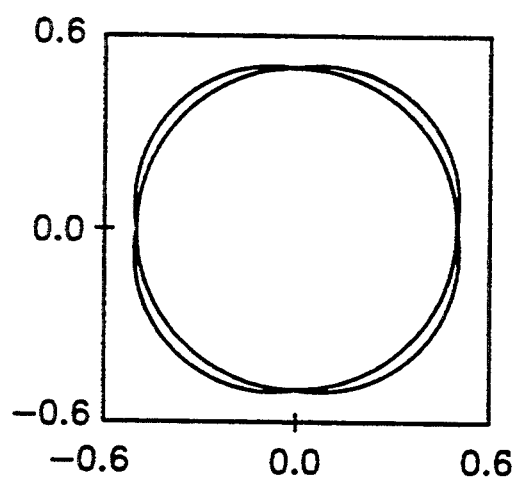

The selection of appropriate initial conditions for $u_n$ plays an important role in the effectiveness of the learning. Here, all initial values of $u_n$ were selected to be exactly zero except the last unit, where $u_6$=0.5 was chosen. This corresponds to an initial point on the circle. The length of the trajectory was increased successively, as in the previous case. In spite of the fact that we allowed the system to perform up to 800 iterations, the learning was essentially completed in about 200 iterations, as shown in FIG. 13. The results of the network's recall are presented in FIG. 12, which shows an excellent match.

Figure Eight Trajectory

For this problem, the synaptic interconnections were initialized to uniform random values between $-1$ and $+1$. As initial conditions, the values of $u_n$ were assumed to be uniform random numbers between $-0.01$ and $0.01$. The following three situations were examined.

CASE—4

Figure 14:
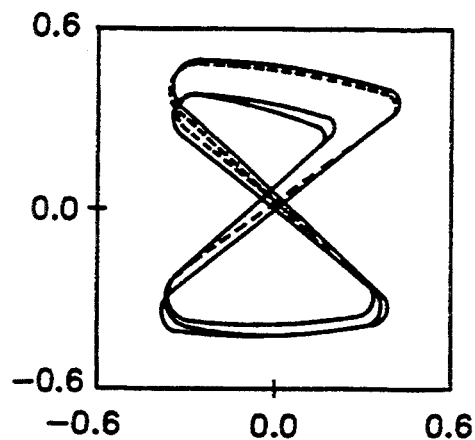
FIGS. 14, 15 ad 16 illustrate different simulation results of a neural network learning a figure-eight motion using the invention.

The training was performed over $t_f = 6.5$ time units( i.e., 65 time intervals). A maximum number of 1000 iterations was allowed. The results shown in FIG. 14 were obtained by starting the network with the same initial conditions, $u_n(0)$, as used for training, the learned values of the synaptic interconnections, $T_{nm}$, and with no teacher forcing ($\lambda = 0$). As we can see, it takes about 3 cycles until the network reaches a consistent trajectory. Despite the fact that the system's output was plotted for more than 15 cycles, only the first. 3 cycles can be distinguished.

CASE—5

Figure 15:
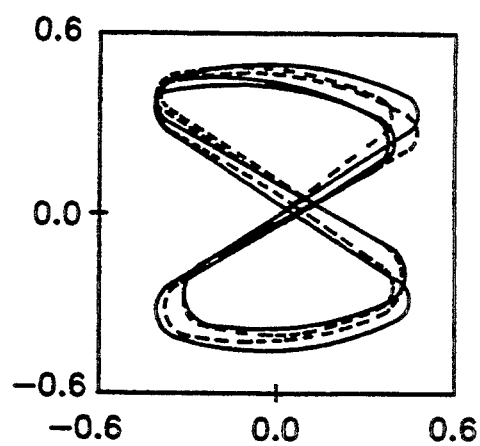
Figure 17:
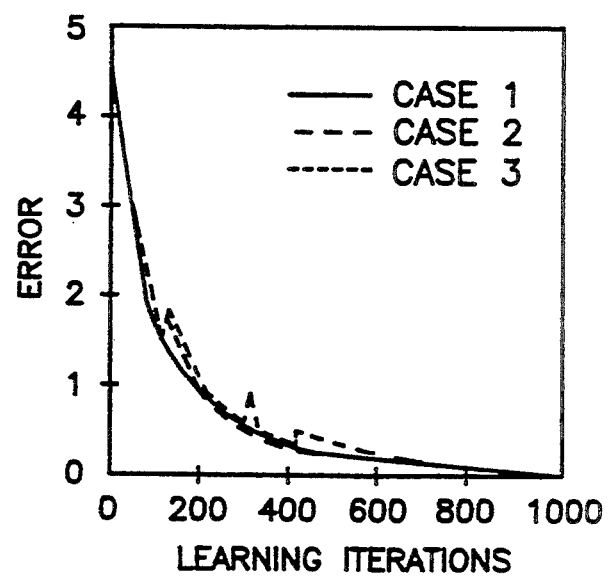
FIG. 17 is a graph of the error as a function of the number of learning iterations for each of the cases illustrated in FIGS. 14–16.

Here, we again decided to increase the length of the trajectory gradually. A maximum number of 1000 iterations was now allowed. The length of the training trajectory was 65 time intervals for the first 100 iterations, and was increased every 100 iterations by 5 time intervals. Therefore, it was again expected that the objective functional would increase whenever the length of the trajectory was increased. This was indeed observed, as may be seen from the learning graph, shown in FIG. 17. The output of the trained network is illustrated in FIG. 15. Here again, from 15 recall cycles, only the first three (needed to reach the steady orbit) are distinguishable, and the rest overlap. As a direct result of training using greater trajectory lengths, orbits much closer to the desired one than in the previous case were obtained.

CASE—6

Figure 16:
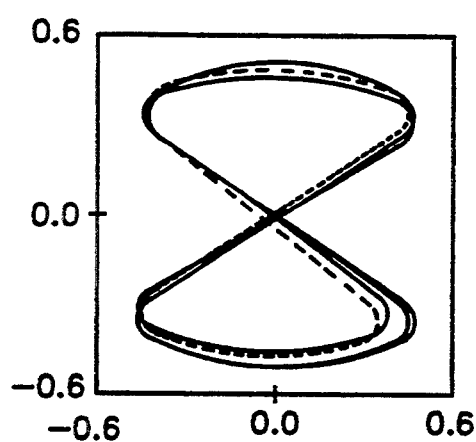

The learning in this case was performed under conditions similar to CASE—5. but with the distinction that A was modulated according to Eq. (12). The results of the network's recall are presented in FIG. 16, and demonstrate a dramatic improvement with respect to the previous two cases.

It is important to keep in mind the following observations with regard to the foregoing simulation results:

1) For the circular trajectory, $\lambda$ was kept constant throughout the simulations and not modulated according to Eq. (12). As we can see from FIG. 13, in cases 1 and 2 the error functional was not reduced to zero. Hence, a discrepancy in the functional form of the neural activation dynamics used during the learning and recall stages occurred. This was a probable cause for the poor performance of the network. In case 3, however, the error functional was reduced to zero. Therefore, the teacher forcing effect vanished by the end of the learning.

2) For the figure eight trajectory, the differences between cases 5 and 6 lies in the modulation of A, (i.e., the amplitude of the teacher forcing). Even though in both cases the error functional was reduced to a negligible level, the effect of the teacher forcing in case 5 was not completely eliminated over the entire length of the trajectory. This points toward the fact that modulation of A not only reduces the number of iterations but, also provides higher quality results.

In order to assess the effectiveness of the new method, the foregoing simulations applied it to two examples of representative complexity which have recently been analyzed in the open literature. We have demonstrated that a circular trajectory can be learned in approximately 200 iterations compared to the 12000 reported by Pearlmutter (1989). A figure eight trajectory was achieved in under 500 iterations compared to 20000 previously required. Most important, however, is the quality of the obtained results. The trajectories computed using our new method are much closer to the target trajectories than was reported in previous studies.

While the invention has been described in accordance with the preferred embodiment in which the feedback is reduced as a function of the error $E(\tau)$ over successive learning cycles, it may be that in some instances such a decrease will not be steady and may not even occur in individual cycles. Moreover, other schemes to modulate the feedback in accordance with the invention may be employed. For example, in those cases where a stead); decrease in the error $E(\tau)$ over successive cycles may be generally expected, the feedback could be modulated as a function of the number of cycles independently or dependently of the error $E(\tau)$. Moreover: while the invention has been described with reference to a gradient descent, algorithm used to adjust both the synapse weights and the neuron gains, any subset or all of these neural network parameters or other neural network parameters may be adjusted. For example, it may be that only the synapse weights would be adjusted at the end of each repetitive cycle.

While the invention has been described in connection with training a neural network with time-varying training vectors and target vectors, the invention may also be applied in training neural networks with time-invariant training vectors and target vectors.

While the invention has been described in detail by specific reference to preferred embodiments of the invention, it is understood that variations and modifications thereof may be made without departing from the true spirit and scope of the invention.

What is claimed is:

1. Apparatus for training a neural network comprising input, hidden and output sets of neurons having respective neuron gains interconnected by respective synapses having respective synapse weights to produce at outputs of said output set of neurons a time-varying target vector in response to a time-varying training vector applied to inputs of said input set of neurons, said time-varying training and target vectors being defined for a predetermined time interval, said apparatus comprising:

means for applying respective elements of said time-varying training vector to the inputs of respective ones of said input set of neurons during said predetermined time interval;

means for measuring an error vector constructed from the differences between the output values produced at the outputs of said output set of neurons and corresponding elements of said time-varying target vector during said predetermined time interval;

means for determining a function of each individual element of said error vector during said predetermined time interval;

means for feeding back said function of each individual element of said error vector to inputs of respective ones of said set of output neurons during said predetermined time interval;

means responsive to said error vector and to current values of said neuron gains and synapse weights for changing at least one of (a) said neuron gains and (b) said synapse weights in accordance with a gradient descent algorithm at the end of said predetermined time interval to decrease the magnitude of the said error vector; and wherein, said means for applying, said means for measuring, said means for determining, said means for feeding back and said means for changing all operate together in repetitive cycles, each of said cycles having a time duration equal to said predetermined time interval; and, said means for determining a function of each individual element of said error vector comprises means for modulating said function in accordance with measurements of said error vector by said means for measuring during a previous one of said repetitive cycles.

2. The apparatus of claim 1 wherein said means for modulating said function comprises means for multiplying said function by a factor that depends upon the measurements of all elements of said error vector measured by said means for measuring during an immediately preceding one of said repetitive cycles.

3. The apparatus of claim 2 wherein said factor is 1-exp, wherein $E(\tau)$ is an integral over said predetermined time interval of a sum of squares of all elements of the error vector measured during said immediately preceding one of said repetitive cycles.

4. The apparatus of claim 1 wherein said means for determining a function of each element of said error vector comprises means for scaling said function.

5. The apparatus of claim 4 wherein said means for scaling comprise means fox raising each element of said error vector to an exponential power of $\beta$, raising the corresponding element of said time-varying target vector to an exponential power of $1-\beta$, and multiplying them together, wherein $\beta$ is a rational number less than one.

6. The apparatus of claim 5 wherein $\beta$ is on the order of approximately 7/9.

7. The apparatus of claim 1 wherein the outputs of each of said neurons obey a set of differential equations during said predetermined time interval, said differential equation being a function of said neuron gains, said synapse weights and said time-varying training and target vectors, and wherein said means for computing said changes by performing a gradient descent algorithm comprise:

means for deriving a set of sensitivity equations from said set of differential equations;

means for solving said set of sensitivity equations once for each one of a set of parameters of said neural network, said parameters comprising at least one of (a) said neuron gains and (b) said synapse weights;

means for computing a differential of the output value of each neuron with respect to corresponding ones of said parameters; and means for computing a change to be made to each one of said parameters at the end of said predetermined time interval by integrating over said predetermined time interval the product of said differential and a corresponding element of said error vector.

8. The apparatus of claim 1 further comprising:
means for progressively decreasing said function in successive ones of said repetitive cycles.

9. The apparatus of claim 8 wherein said means for progressively decreasing said function decreases said function as a function of a decrease in a functional of said error vector over said successive ones of said repetitive cycles.

10. The apparatus of claim 9 wherein said functional comprises an integral of a function of each element of said error vector measured during a previous one of said repetitive cycles.

11. A method for training a neural network comprising input, hidden and output sets of neurons having respective neuron gains interconnected by respective synapses having respective synapse weights to produce at outputs of said output set of neurons a time-varying target vector in response to a time-varying training vector applied to inputs of said input set of neurons, said time-varying training and target vectors being defined for a predetermined time interval, said method comprising:

applying respective elements of said time-varying training vector to the inputs of respective ones of said input set of neurons during said predetermined time interval;

measuring an error vector constructed from the differences between the output values produced at the outputs of said output set of neurons and corresponding elements of said time-varying target vector during said predetermined time interval;

determining a function of each individual element of said error vector during said predetermined time interval;

feeding back said function of each individual element of said error vector to inputs of respective ones of said set of output neurons during said predetermined time interval;

changing at least one of (a) said neuron gains and (b) said synapse weights in response to said error vector and to current values of said neuron gains and synapse weights in accordance with a gradient descent algorithm at the end of said predetermined time interval to decrease the magnitude of the said error vector; and wherein, said applying, said measuring, said determining, said feeding back and said changing is performed in repetitive cycles, each of said cycles having a time duration equal to said predetermined time interval; and, said determining a function of each individual element of said error vector comprises modulating said function in accordance with measurements of said error vector by said measuring during a previous one of said repetitive cycles.

12. The method of claim 11 wherein said modulating said function comprises multiplying said function by a factor that depends upon the measurements of all elements of said error vector measured during an immediately preceding one of said repetitive cycles.

13. The method of claim 12 wherein said factor is 1-exp wherein $E(\tau)$ is an integral over said predetermined time interval of a sum of squares of all elements of the error vector measured during said immediately preceding one of said repetitive cycles.

14. The method of claim 11 wherein said determining a function of each element of said error vector comprises scaling said function.

15. The method of claim 14 wherein said scaling comprise raising each element of said error vector to an exponential power of $\beta$, raising the corresponding element of said time-varying target vector to an exponential power of 1-$\beta$, and multiplying them together, wherein $\beta$ is a rational number less than one.

16. The method of claim 15 wherein $\beta$ is on the order of approximately 7/9.

17. The method of claim 11 wherein the outputs of each of said neurons obey a set of differential equations during said predetermined time interval, said differential equations depending upon said neuron gains, said synapse weights and said time-varying training and target vectors, and wherein said computing said changes comprises:
   deriving a set of sensitivity equations from said set of differential equations;
   solving said set of sensitivity equations once for each one of a set of parameters of said neural network, said parameters comprising at least, one of (a) said neuron gains and (b) said synapse weights;
   computing a differential of the output value of each neuron with respect to corresponding ones of said parameters; and
   computing a change to be made to each one of said parameters at the end of said predetermined time interval by integrating over said predetermined time interval the product of said differential and a corresponding element of said error vector.

18. The method of claim 11 further comprising:
   progressively decreasing said function in successive ones of said repetitive cycles.

19. The method of claim 18 wherein said progressively decreasing said function comprises decreasing said function in accordance with a decrease in a functional of said error vector over said successive ones of said repetitive cycles.

20. A method of training a neural network to output a target vector in response to a training vector, said method comprising:
   feeding back to neuron inputs of said neural network a function of an error vector corresponding to a difference between said target vector and a current output vector of said neural network; and,
   stimulating said neural network with said training vector while feeding back said function of the error vector;
   modulating said function in accordance with a factor dependent upon elements of said error vector;
   said feeding back is performed in repetitive cycles of a cyclic period and cyclically adjusting parameters of said neural network, and wherein said adjusting is performed in accordance with a measurement of said error vector during a previous one of said repetitive cycles.

21. Apparatus for training a neural network comprising input, hidden and output sets of neurons having respective neuron gains interconnected by respective synapses having respective synapse weights to produce at outputs of said output set of neurons a target vector in response to a training vector applied to inputs of said input set of neurons, said apparatus comprising:
   means for applying respective elements of said training vector to the inputs of respective ones of said input set of neurons;
   means for measuring an error vector constructed from the differences between the output values produced at the outputs of said output set of neurons and corresponding elements of said target vector;
   means for determining a function of each individual element of said error vector;
   means for feeding back said function of each individual element of said error vector to inputs of respective ones of said set of output neurons;
   means responsive to said error vector and to current values of said neuron gains and synapse weights for changing at least one of (a) said neuron gains and (b) said synapse weights in accordance with a gradient descent algorithm to decrease the magnitude of the said error vector; and wherein,
   said means for applying, said means for measuring, said means for determining, said means for feeding back and said means for changing all operate together in repetitive cycles, each of said cycles having a time duration equal to a predetermined time interval; and,
   said means for determining a function of each individual element of said error vector comprises means for modulating said function in accordance with measurements of said error vector by said means for measuring during a previous one of said repetitive cycles.

22. The apparatus of claim 21 wherein said means for modulating said function comprises means for multiplying said function by a factor that depends upon the measurements of all elements of said error vector measured by said means for measuring during an immediately preceding one of said repetitive cycles.

23. The apparatus of claim 22 wherein said factor is 1-exp, wherein E($\tau$) is an integral over said predetermined time interval of a sum of squares of all elements of the error vector measured during said immediately preceding one of said repetitive cycles.

24. The apparatus of claim 21 wherein said means for determining a function of each element of said error vector comprises means for scaling said function.

25. The apparatus of claim 24 wherein said means for scaling comprise means for raising each element of said error vector to an exponential power of $\beta$, raising the corresponding element of said target vector to an exponential power of 1-$\beta$, and multiplying them together, wherein $\beta$ is a rational number less than one.

26. The apparatus of claim 25 wherein $\beta$ is on the order of approximately 7/9.

27. The apparatus of claim 21, wherein the outputs of each of said neurons obey a set of differential equations during said predetermined time interval, said differential equation being a function of said neuron gains, said synapse weights and said training and target vectors, and wherein said means for computing said changes by performing a gradient descent, algorithm comprise:
   means for deriving a set of sensitivity equations from said set of differential equations:
   means for solving said set of sensitivity equations once for each one of a set of parameters of said neural network, said parameters comprising at least, one of (a) said neuron gains and (b) said synapse weights;
   means for computing a differential of the output value of each neuron with respect to corresponding ones of said parameters; and
   means for computing a change to be made to each one of said parameters at the end of said predetermined time interval by integrating over said predetermined time interval the product of said differential and a corresponding element of said error vector.

28. The apparatus of claim 21 further comprising:
means for progressively decreasing said function in successive ones of said repetitive cycles.

29. The apparatus of claim 28 wherein said means for progressively decreasing said function decreases said function as a function of a decrease in a functional of said error vector over said successive ones of said repetitive cycles.

30. The apparatus of claim 29 wherein said functional comprises an integral of a function of each element of said error vector measured during a previous one of said repetitive cycles.

31. A method for training a neural network comprising input, hidden and output sets of neurons having respective neuron gains interconnected by respective synapses having respective synapse weights to produce at outputs of said output set of neurons a target vector in response to a training vector applied to inputs of said input set of neurons, said method comprising:
applying respective elements of said training vector to the inputs of respective ones of said input set of neurons;
measuring an error vector constructed from the differences between the output values produced at the outputs of said output set of neurons and corresponding elements of said target vector;
determining a function of each individual element of said error vector;
feeding back said function of each individual element of said error vector to inputs of respective ones of said set of output neurons;
changing at least one of (a) said neuron gains and (b) said synapse weights in response to said error vector and to current values of said neuron gains and synapse weights in accordance with a gradient descent algorithm to decrease the magnitude of the said error vector; and wherein,
said applying, said measuring, said determining, said feeding back and said changing is performed in repetitive cycles, each of said cycles having a time duration equal to a predetermined time interval; and,
said determining a function of each individual element of said error vector comprises modulating said function in accordance with measurements of said error vector by said measuring during a previous one of said repetitive cycles.

32. The method of claim 31 wherein said modulating said function comprises multiplying said function by a factor that depends upon the measurements of all elements of said error vector measured during an immediately preceding one of said repetitive cycles.

33. The method of claim 32 wherein said factor is 1-exp, wherein $E(\tau)$ is an integral over said predetermined time interval of a sum of squares of all elements of the error vector measured during said immediately preceding one of said repetitive cycles.

34. The method of claim 31 wherein said determining a function of each element of said error vector comprises scaling said function.

35. The method of claim 34 wherein said scaling comprise raising each element of said error vector to an exponential prover of $\beta$, raising the corresponding element of said target vector to an exponential power of 1-$\beta$, and multiplying them together, wherein $\beta$ is a rational number less than one.

36. The method of claim 35 wherein $\beta$ is on the order of approximately 7/9.

37. The method of claim 31 wherein the outputs of each of said neurons obey a set of differential equations, during said predetermined time interval, said differential equations depending upon said neuron gains, said synapse weights and said training and target vectors, and wherein said computing said changes comprises:
deriving a set, of sensitivity equations from said set, of differential equations;
solving said set of sensitivity equations once for each one of a set of parameters of said neural network, said parameters comprising at least one of (a) said neuron gains and (b) said synapse weights;
computing a differential of the output value of each neuron with respect to corresponding ones-of said parameters; and
computing a change to be made to each one of said parameters at the end of said predetermined time interval by integrating over said predetermined time interval the product of said differential and a corresponding element of said error vector.

38. The method of claim 31 further comprising:
progressively decreasing said function in successive ones of said repetitive cycles.

39. The method of claim 38 wherein said progressively decreasing said function comprises decreasing said function in accordance with a decrease in a functional of said error vector over said successive ones of said repetitive cycles.

* * * * *